US011873201B2

(12) United States Patent
Martin

(10) Patent No.: US 11,873,201 B2
(45) Date of Patent: Jan. 16, 2024

(54) PORTABLE AERATOR

(71) Applicant: Felix B. Martin, Ladera Ranch, CA (US)

(72) Inventor: Felix B. Martin, Ladera Ranch, CA (US)

( * ) Notice: Subject to any disclaimer, the term of this patent is extended or adjusted under 35 U.S.C. 154(b) by 255 days.

(21) Appl. No.: 17/527,069

(22) Filed: Nov. 15, 2021

(65) Prior Publication Data

US 2022/0169487 A1 Jun. 2, 2022

Related U.S. Application Data

(60) Provisional application No. 63/118,827, filed on Nov. 27, 2020.

(51) Int. Cl.

| | |
|---|---|
| ***B67B 7/04*** | (2006.01) |
| ***B67B 7/06*** | (2006.01) |
| ***B01F 23/232*** | (2022.01) |
| *B01F 101/17* | (2022.01) |

(52) U.S. Cl.

CPC .......... *B67B 7/0441* (2013.01); *B01F 23/232* (2022.01); *B01F 2101/17* (2022.01); *B67B 7/06* (2013.01)

(58) Field of Classification Search

CPC ......... B01F 2101/17; B67B 7/08; B67B 7/06; B67B 7/0441; B65D 47/242

USPC ................................................ 81/3.09; 7/165

See application file for complete search history.

(56) References Cited

U.S. PATENT DOCUMENTS

| | | | | |
|---|---|---|---|---|
| 8,707,828 B2 | 4/2014 | Ward | | |
| 2012/0056339 A1* | 3/2012 | Chiorazzi | ........... B01F 33/5011 | 261/76 |

* cited by examiner

*Primary Examiner* — Tom Rodgers

(74) *Attorney, Agent, or Firm* — Kevin Schraven; Heber Martin Carbajal; Hankin Patent Law, APC

(57) ABSTRACT

A portable aerator comprising: a main aeration body; a base portion; an internal cavity; at least one ventilation shaft; a spout portion; an aeration opening; and an aeration inlet. The internal cavity comprises a threaded channel and cavity extends from a base portion opening to a spout portion opening. The internal cavity is configured to pass a liquid, such as wine that enters the internal cavity body at the base opening out through the spout portion opening. The threaded channel is threaded on an interior surface, such that the threaded channel is configured to matingly engage and disengage with a worm of a corkscrew bottle opening device, such as a waiter's wine key, via twisting and untwisting, respectively. The aerator device may have at least one ventilation shaft, an aeration shaft, and/or an extension tube.

17 Claims, 6 Drawing Sheets

PORTABLE AERATOR

CROSS-REFERENCE TO RELATED APPLICATIONS

This U.S. Non-Provisional patent application claims the benefit of U.S. Provisional Patent Application No. 63/118,827, filed on Nov. 27, 2020, by Felix Martin, titled Novel Wine Aerator Application Device For Corkscrews And Liquid Aerating, the contents of which are hereby expressly incorporated herein as though set forth in their entirety, and to which priority is claimed.

FIELD OF USE

The present disclosure relates generally to a wine aerating apparatus that can be attached and removed from a corkscrew, bottle opener, wine key, or waiter's wine key, and subsequently placed on a corked bottle opening for pouring and aerating. More specifically, the present disclosure relates to an aeration pourer that has an internal threaded channel that allows the aerating apparatus to be affixed to or removed from a corkscrew, bottle opener, wine key, or waiter's wine key by twisting, sliding, pulling, or pushing. Preferably, the pourer has both a ventilation shaft and an aeration hole.

BACKGROUND

In the world of wine, there are numerous corked bottle openers and separate apparatuses to allow poured wine to aerate creating a more enjoyable experience for the wine drinker. There are several variations of the corked bottle opener, including twisting corkscrews, waiter's corkscrews, bottle openers, wine keys, waiter's wine keys, and air pressure wine openers.

A wine aerator is useful as it works by introducing a larger amount of oxidation to the wine than would be normally achieved when the wine is allowed to breathe on its own.

Although there are many types of bottle openers and many types of wine aerators, there does not exist an aerator that is configured to matingly engage with a worm or corkscrew of a bottle opener. This would provide a convenient way to store and carry a wine aerator.

Therefore, a need exists in the field for a novel wine aerator that can be affixed to a worm or corkscrew of a waiter's corkscrew or wine key for singular, convenient, and compact carry.

SUMMARY

To minimize the limitations in the cited references, and to minimize other limitations that will become apparent upon reading and understanding the present specification, the present specification discloses a portable aerator with a threaded channel that allows for fluid, typically a liquid, such as wine, to pour through the body and out the spout opposite the base. The threaded channel, which is also referred to as the threaded channel, allows the portable aerator to be removeably engaged with a worm or a corkscrew of a bottle opener or wine key. Preferably, the aerator is twisted or screwed on to the worm and is thus kept substantially in place (no accidental slipping) until it is unscrewed or twisted off. In other embodiments, the surface of the threaded channel may engage with the worm wherein friction keeps the aerator engaged with the worm.

One embodiment may be a portable aerator, comprising: a main aeration body; a base portion; an internal cavity; and a spout portion. The internal cavity may comprise a threaded channel and extend from a base portion opening to a spout portion opening. The internal cavity may be configured to pass a liquid that enters the internal cavity body at the base opening out through the spout portion opening. The threaded channel may be threaded on an interior surface, such that the threaded channel may be configured to matingly engage and disengage with a worm of a corkscrew bottle opening device via twisting and untwisting, respectively. The base portion may be configured to matingly engage with an interior surface of a bottle opening of a bottle containing the liquid. The portable aerator may also include at least one ventilation shaft. The ventilation shaft may comprise a ventilation base opening and one or more side vents. The ventilation shaft may be configured to pass air from the one or more side vents to a ventilation base opening when the liquid may be passed through the internal cavity. At least one of the side vents may be not covered by the bottle opening when the portable aerator may be engaged with the bottle opening. The portable aerator may further comprise an aeration opening and an aeration inlet. The aeration opening and the aeration inlet may be configured to allow air to be drawn into the liquid as it passes through the internal cavity. Preferably, the aeration inlet may be located at a narrow point of the internal cavity. The ventilation shaft may comprise an extension tube that may be telescoping, such that it may be configured to have a stored configuration and an extended configuration. The corkscrew bottle opening device may be a waiter's wine key. When the portable aerator may be engaged with the worm, the portable aerator may preferably be substantially held in place until it may be untwisted from the worm. The outer surface of the base portion may be made of cork and/or rubber, and the base portion may be tapered.

Another embodiment may be a portable aerator, comprising: a main aeration body; a base portion; an internal cavity; at least one ventilation shaft; a spout portion; an aeration opening; and an aeration inlet. The internal cavity may comprise a threaded channel and extends from a base portion opening to a spout portion opening. The internal cavity may be configured to pass a liquid that enters the internal cavity body at the base opening out through the spout portion opening. The threaded channel may be threaded on an interior surface, such that the threaded channel may be configured to matingly engage and disengage with a worm of a corkscrew bottle opening device via twisting and untwisting, respectively. The base portion may be configured to matingly engage with an interior surface of a bottle opening of a bottle containing the liquid. The ventilation shaft may comprise a ventilation base opening and one or more side vents. The ventilation shaft may be configured to pass air from the one or more side vents to a ventilation base opening when the liquid may be passed through the internal cavity. The side vents may be not covered by the bottle opening when the portable aerator may be engaged with the bottle opening. The aeration opening and the aeration inlet may be configured to allow air to be drawn into the liquid as it passes through the internal cavity. The aeration inlet may be located at a narrow point of the internal cavity. The ventilation shaft may further comprise a telescoping extension tube that may be configured to have stored and extended configurations. When the portable aerator may be engaged with the worm, the portable aerator may be kept substantially in place until it may be untwisted from the worm.

Another embodiment may be a portable aerator, comprising: a main aeration body; a base portion; an internal cavity;

at least one ventilation shaft; a spout portion; an aeration opening; and an aeration inlet; wherein the internal cavity may comprise a threaded channel; wherein the internal cavity extends from a base portion opening to a spout portion opening; wherein the internal cavity may be configured to pass a liquid that enters the internal cavity body at the base opening out through the spout portion opening; wherein the threaded channel may be threaded on an interior surface, such that the threaded channel may be configured to matingly engage and disengage with a worm of a corkscrew bottle opening device via twisting and untwisting, respectively; wherein the base portion may be configured to matingly engage with an interior surface of a bottle opening of a bottle containing the liquid; wherein the at least one ventilation shaft may comprise a ventilation base opening and one or more side vents; wherein the ventilation shaft may be configured to pass air from the one or more side vents to a ventilation base opening when the liquid may be passed through the internal cavity; wherein at least one of the one or more side vents may be not covered by the bottle opening when the portable aerator may be engaged with the bottle opening; wherein the aeration opening and the aeration inlet allow air to be drawn into the liquid as it passes through the internal cavity; wherein the at least one ventilation shaft further may comprise an extension tube; wherein the extension tube may be telescoping, such that it has a stored configuration and an extended configuration; and wherein when the portable aerator may be engaged with the worm, the portable aerator may be kept substantially in place until it may be untwisted from the worm. The aeration inlet may be located at a narrow point of the internal cavity. The base portion may be tapered.

In various embodiments, the wine aerating apparatus can be made from plastic, rubber, metal, wood, and/or cork. The bottle engagement portion of the portable aerator can be tapered, such that it gets narrower, which may allow it to fit with a wide variety of bottles.

Other features and advantages will become apparent to those skilled in the art from the following detailed description and its accompanying drawings.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DESCRIPTION OF THE DRAWINGS

Figure 1:
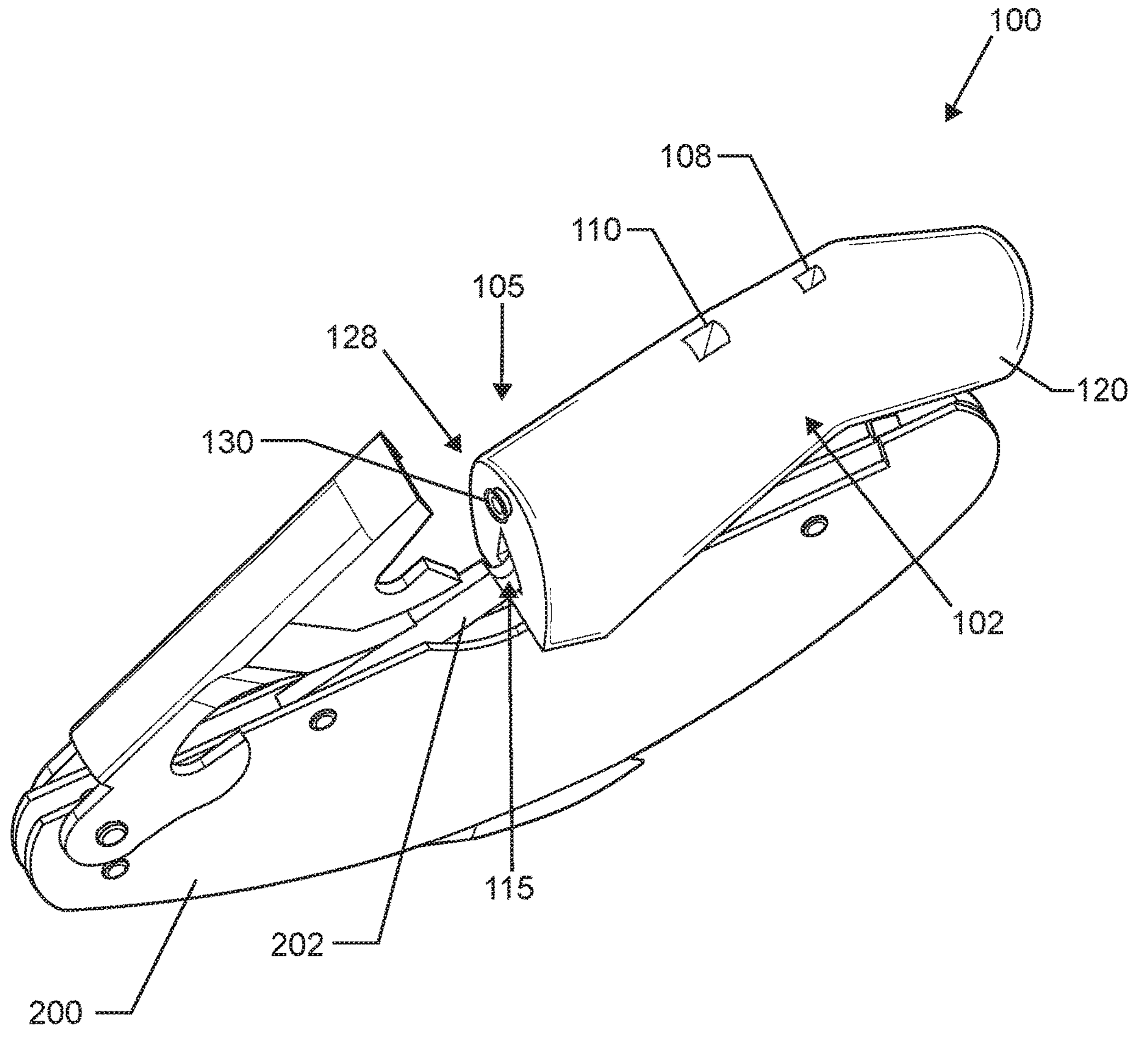
FIG. 1 is an illustration of a perspective view of one embodiment of the portable aerator that is engaged with a waiter's wine key type bottle opener.

In the following detailed description of various embodiments, numerous specific details are set forth in order to provide a thorough understanding of various aspects of the embodiments. However, the embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, group of items, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, group of items, or result. In another example, substantially all of a group of items, may include all of the items of that group, or at least all of the items of that group that re generally within the normal parameters for the items. To the extent that the group of items might include members that far exceed the normal parameters, this abnormal item might not be expected to be part of substantially all the group of items.

As used herein, the terms "approximately" and "about" generally refer to a deviance of within 5% of the indicated number or range of numbers. In one embodiment, the term "approximately" and "about", may refer to a deviance of between 0.0001-40% from the indicated number or range of numbers.

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

REFERENCE NAMES

100 portable aerator
102 main body
105 base portion
108 aeration opening
109 aeration inlet
110 side vent
111 ventilation shaft
115 base portion opening
116 threaded channel
117 spout portion opening
120 spout portion
128 ventilation base opening
130 extension tube end opening
135 extension tube
140 threads
199 internal cavity
200 waiter's wine key
202 worm or corkscrew
205 waiter's wine key handle
300 bottle
302 bottle opening FIG. 1 is an illustration of a perspective view of one embodiment of the portable aerator that is engaged with a waiter's wine key type bottle opener. As shown in FIG. 1, the portable aerator 100 may comprise a main body 102, spout portion 120, base portion 105, aeration opening 108, side vent 110, base portion opening 115, ventilation base opening 128, and extension tube end opening 130. FIG. 1 shows that the portable aerator may engage the worm 202 of the waiter's wine key 200. A waiter's wine key is a well-known device that is used for extracting a cork from a bottle. The cork or stopper may be engaged by the worm 202, which may also be referred to as a corkscrew, and then the cork or stopper may be extracted through leverage and pulling. By engaging the portable aerator 100 to the waiter's wine key 200, the portable aerator 100 may be available to be used whenever the user is opening a bottle of wine with that wine key. The waiter's wine key 200 is just one example of a corkscrew bottle opening device that may be engaged by the portable aerator 100. Any type of bottle opener with a worm may be engaged by the portable aerator 100.

Figure 2:
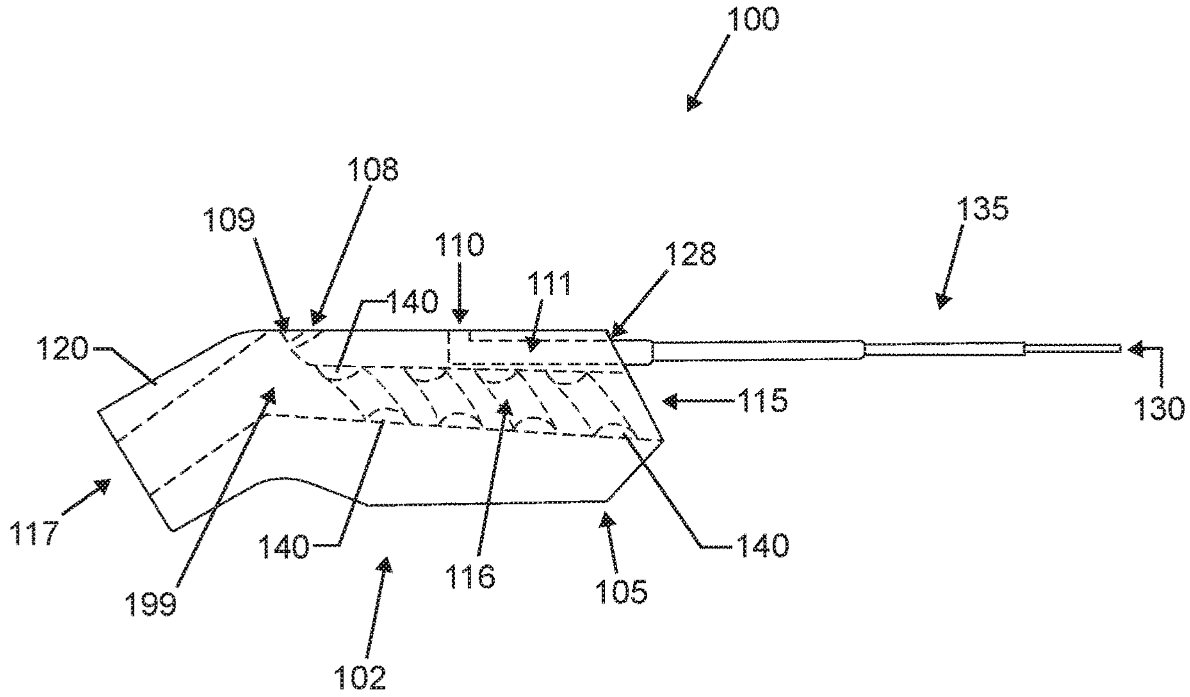
FIG. 2 is an illustration of a cross-section view of one embodiment of the portable aerator showing the inner shape of the aeration device, as well as an extendable ventilation or breather tube fully extended.

FIG. 2 is an illustration of a cross-section view of one embodiment of the portable aerator showing the inner shape of the aeration device, as well as an extendable ventilation or breather tube fully extended. FIG. 2 shows that the portable aerator 100 may comprise a main body 102, spout portion 120, base portion 105, aeration opening 108, aeration inlet 109, side vent 110, ventilation shaft 111, base portion opening 115, threaded channel 116, spout portion opening 117, ventilation base opening 128, extension tube end opening 130, extension tube 135, and threads 140. As shown in FIG. 2, the portable aerator 100 has an internal cavity 199 that runs from the base portion opening 115 to the spout portion opening 117. The internal cavity 199 allows a liquid in a bottle to traverse the portable aerator 100. FIG. 2 shows that the base portion 105 may be tapered downward to be able to matingly engage a bottle. To allow liquid to flow from the base portion opening 115 to the spout portion opening 117 the aerator 100 preferably has at least one ventilation shaft 111 that allows air to flow from the side vent to the ventilation base opening 128 and/or to the extension tube end opening 130. Preferably, the aerator may have an aeration opening 108, which allows air to be sucked into the cavity 199 through the aeration inlet 109. As shown, the aeration inlet 109 may preferably be at a narrow point in the cavity 199, such that a venturi effect is created. In this manner, when a liquid flows past the aeration inlet 109, the resulting negative pressure due to the venturi effect draws air into the stream of liquid. As a result, tiny air bubbles are injected into the liquid, which results in the liquid being aerated. In a preferred embodiment, the narrow point may be where the distance from the atmosphere to the cavity 199 is relatively short. In other embodiments, the base portion 105 may have rubber flanges designed to deform and make an airtight seal with the bottle opening.

FIG. 2 shows that the threaded channel 116, which is part of the cavity 199, may be formed by threads 140 that are on the surface of the threaded channel 116. The threaded channel 116 may be configured to matingly engage with a worm or corkscrew of a bottle opener. Specifically, via the threaded channel 116, the portable aerator 100 may be twisted or screwed onto the worm. Once twisted on to the worm, the portable aerator 100 may be substantially held in place, which means, at a minimum, it preferably does not accidentally slip from its engaged position. When the user wants to open a bottle with a cork (natural, composite, engineered, and/or artificial), the user may twist off the portable aerator 100. Once the cork is extracted, the user may affix the portable aerator 100 to the bottle opening, which allows the user to aerate the liquid when pouring.

FIG. 2 also shows that the portable aerator 100 may have an extension tube 135 that telescopes in and out between a stored and an extended position. FIG. 1 shows the extension tube 135 in a stored configuration. FIG. 2 shows the extension tube 135 in an extended configuration. Using the extension tube 135 when pouring may allow for a smoother pour.

In various embodiments, the pourer main body 102 may be substantially cylindrical, as shown, or may be in substantially any shape, such as triangular and oval.

The base portion 105 is preferably the shape that allows it to matingly engage with a bottle opening. If the bottle opening is cylindrical, square, or oval, than the base portion 105 may be reciprocally cylindrical, square, or oval, respectively.

The spout portion 120 is shown as a cylindrical and bent shape. In other embodiments, the spout portion 120 may have an outer shape that is curved, fluted, oval, straight, cylindrical, rectangular, triangular, or the like.

The portable aerator 100 may, in whole or in part, be composite, cork, plastic, glass, rubber, wood, and combinations thereof. For example, the base portion 105 may have, at least, a cork or rubber exterior surface in order to sealingly and matingly engage a bottle opening. Preferably, the cavity 199 may be plastic, glass or lined with plastic, or glass to provide a non-reactive surface with which the liquid may come into contact.

The cavity 199, base portion opening 115, threaded channel 116, base portion opening 115, and spout portion opening 117, may be substantially any shape, including, but not limited to, triangular, square, and/or cylindrical.

Although only one cavity 199 is shown, there may be two or more cavities that allow the liquid to pass through the aerator 100.

Although only one ventilation shaft 111 is shown, there may be more than one ventilating shaft.

Figure 3:
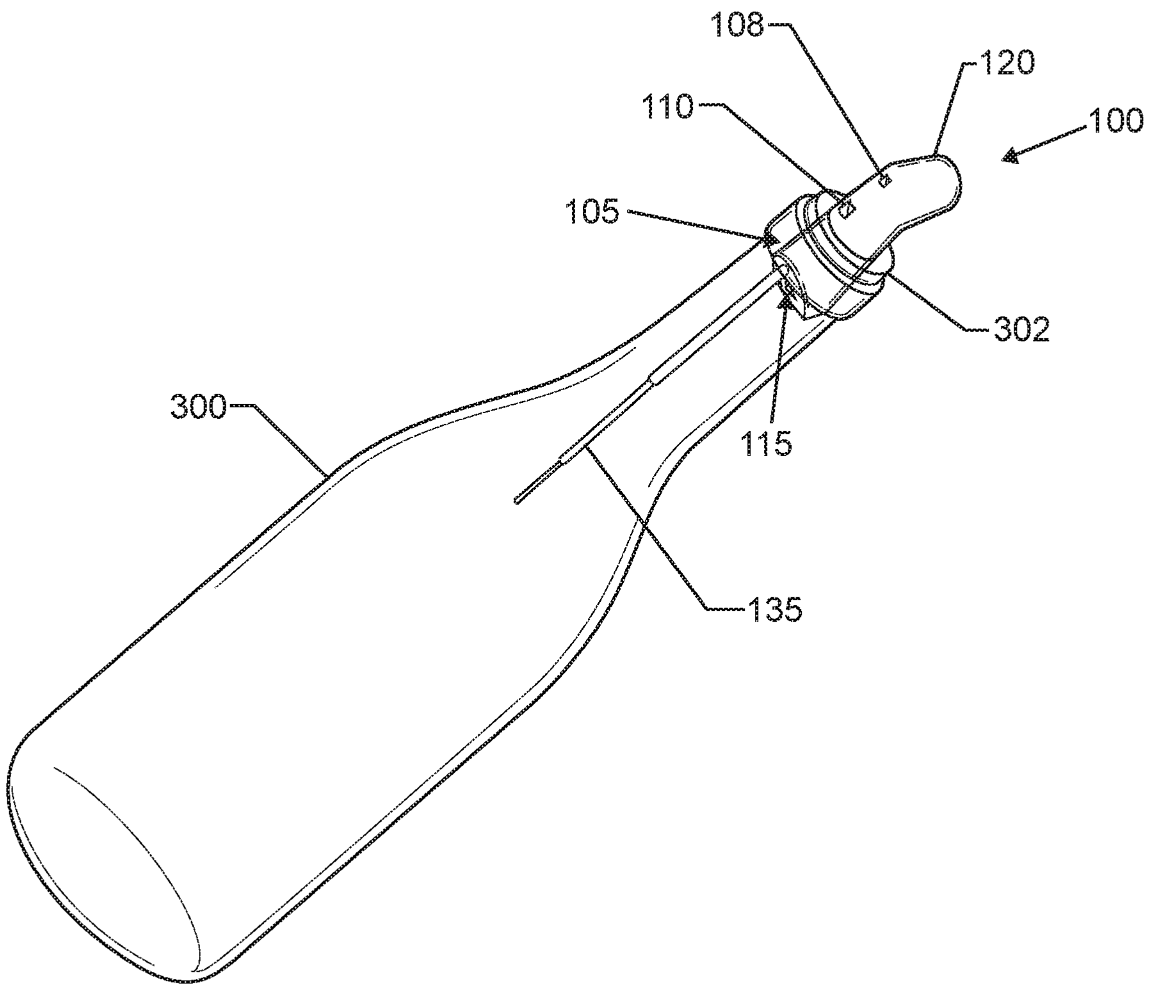
FIG. 3 is an illustration of a perspective view of one embodiment of the portable aerator that is engaged with a beverage bottle.

FIG. 3 is an illustration of a perspective view of one embodiment of the portable aerator that is engaged with a beverage bottle. As shown in FIG. 3, the aerator 100 may matingly engage a bottle 300. As shown, the base portion 105 may fit within the bottle opening 302. FIG. 3 also shows that the side vent 110 is preferably not covered by the bottle opening 302. The base portion opening 115 allows liquid from the bottle to flow out spout portion 120. The aeration opening 108 is shown to allow air to enter the flow of liquid through the cavity 199. The extension tube 135 is shown telescopically extended to be in an extended configuration.

Figure 4:
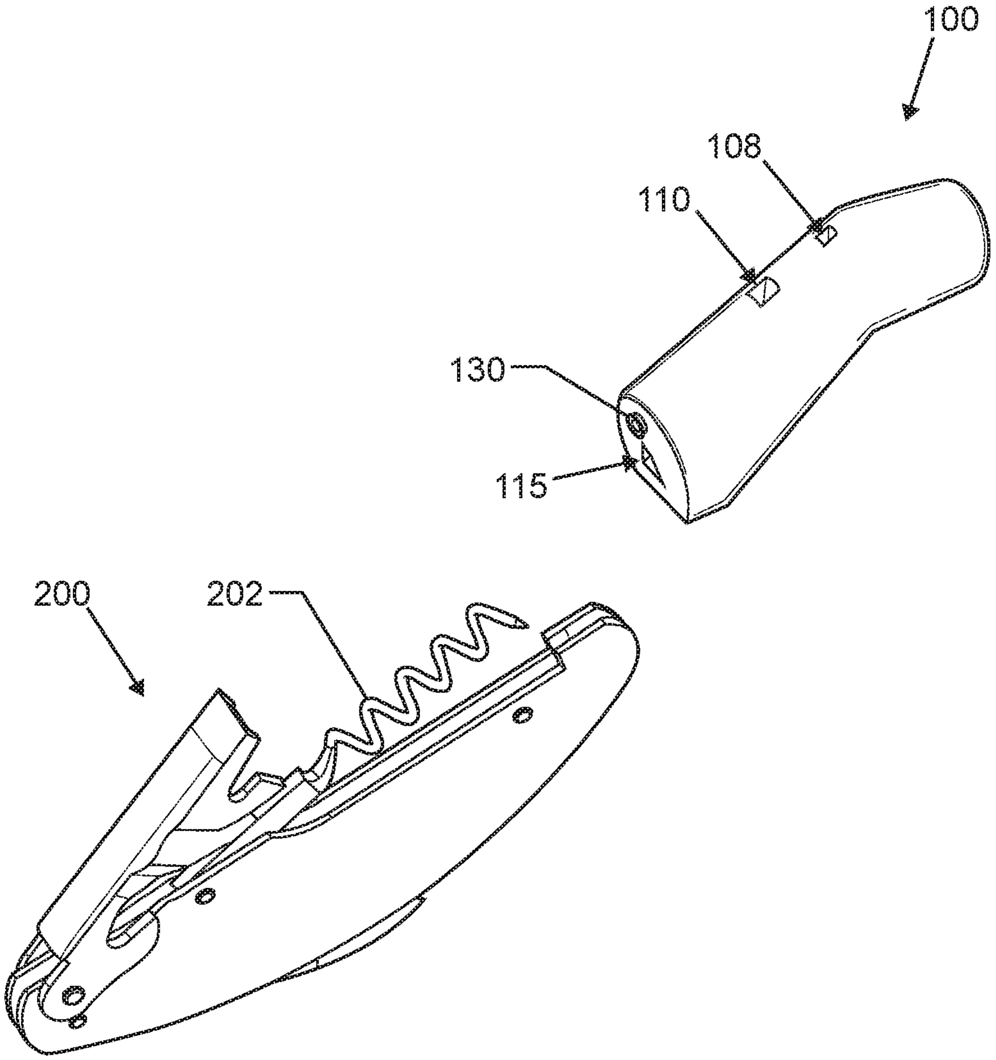
FIG. 4 is an illustration of a perspective view of one embodiment of the portable aerator in close proximity to a waiter's wine key.

FIG. 4 is an illustration of a perspective view of one embodiment of the portable aerator in close proximity to a waiter's wine key. As shown in FIG. 4, the portable aerator 100 may comprise an aeration opening 108, side vent 110, base portion opening 115, and extension tube end opening 130. The base portion opening may be configured to receive and engage the worm 202 of waiter's wine key 200.

Figure 5:
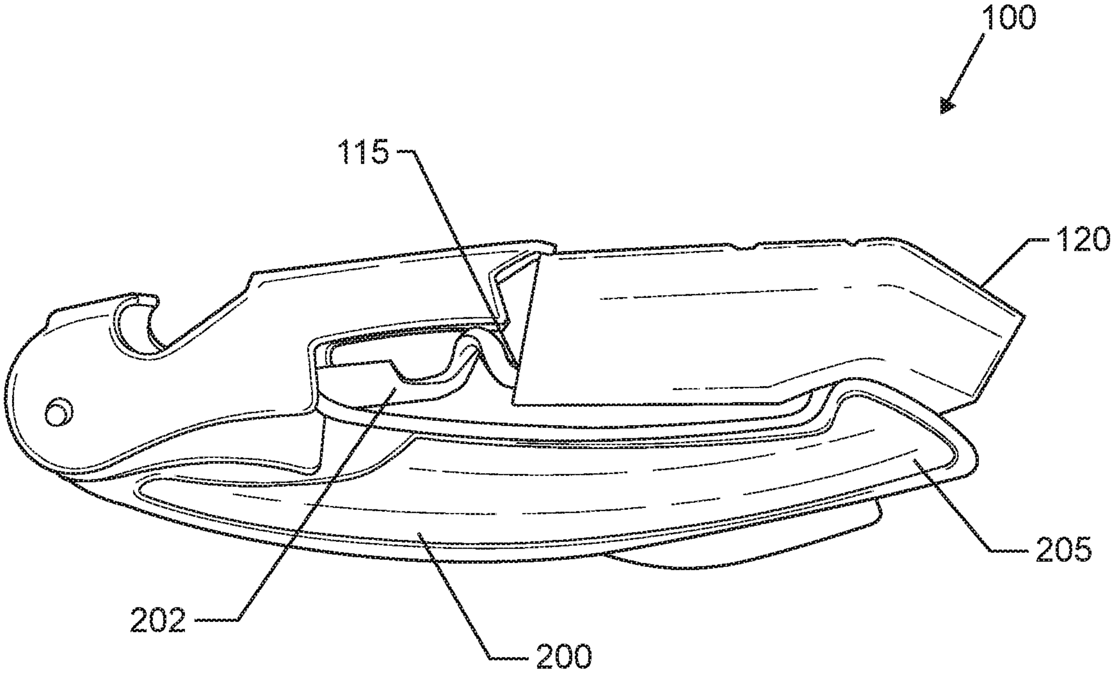
FIG. 5 is an illustration of a side view of one embodiment of a portable aerator that is engaged with a waiter's wine key.

FIG. 5 is an illustration of a side view of one embodiment of a portable aerator that is engaged with a waiter's wine key. As shown in FIG. 5, the portable aerator 100 has been twisted onto the worm 202 of the waiter's wine key 200 via the base portion opening 115. When the worm 202 is folded down towards handle 205, the bent pout portion 120 may matingly conform and nestingly engage the handle 205 so as to make a compact and easily portable unit.

Figure 6:
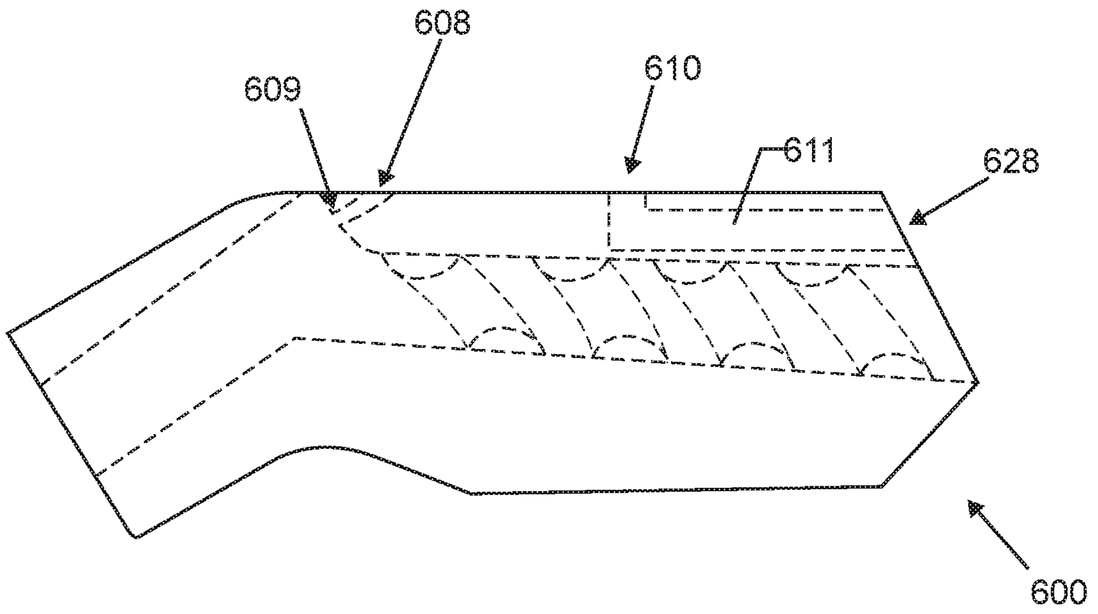
FIG. 6 is an illustration of a cross-section view of one embodiment of the portable aerator showing the ventilation shaft with no telescoping tube.

FIG. 6 is an illustration of a cross-section view of one embodiment of the portable aerator showing the ventilation shaft with no telescoping tube. As shown in FIG. 6, the portable aerator 600 may have a side vent 610 and ventilation shaft 611, and a ventilation base opening. FIG. 6 shows an embodiment without a telescoping tube being engaged with or part of the ventilation shaft 611. Preferably, the aerator 600 may have an aeration opening 608, which allows air to be sucked into the cavity through the aeration inlet 609. As shown, the aeration inlet 609 may preferably be at a narrow point in the cavity, such that a venturi effect is created. In this manner, when a liquid flows past the aeration inlet 609, the resulting negative pressure due to the venturi effect draws air into the stream of liquid. As a result, tiny air bubbles are injected into the liquid, which results in the liquid being aerated.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A portable aerator, comprising:
a main aeration body;
a base portion;
an internal cavity;
a spout portion;
an aeration opening; and
an aeration inlet;
wherein said internal cavity comprises a threaded channel;
wherein said internal cavity extends from a base portion opening to a spout portion opening;
wherein said internal cavity is configured to allow a liquid that enters said internal cavity body at said base opening to pass through said spout portion opening;
wherein said threaded channel is threaded on an interior surface, such that said threaded channel is configured to matingly engage and disengage with a worm of a corkscrew bottle opening device via twisting and untwisting, respectively; and
wherein said base portion has a tapered external surface and is configured to matingly engage with an interior surface of a bottle opening of a bottle containing said liquid.

2. The portable aerator of claim 1, further comprising at least one ventilation shaft;
wherein said at least one ventilation shaft comprises a ventilation base opening and one or more side vents;
wherein said ventilation shaft is configured to pass air from said one or more side vents to a ventilation base opening when said liquid is passed through said internal cavity; and
wherein at least one of said one or more side vents are not covered by said bottle opening when said portable aerator is engaged with said bottle opening.

3. The portable aerator of claim 2, wherein said at least one ventilation shaft further comprises an extension tube.

4. The portable aerator of claim 3, wherein said extension tube is telescoping, such that it is configured to have a stored configuration and an extended configuration.

5. The portable aerator of claim 1, wherein said aeration opening and said aeration inlet are configured to allow air to be drawn into said liquid as said liquid passes through said internal cavity.

6. The portable aerator of claim 5, wherein said aeration inlet is located at a narrow point of said internal cavity.

7. The portable aerator of claim 1, wherein said corkscrew bottle opening device is a waiter's wine key.

8. The portable aerator of claim 1, wherein when said portable aerator is engaged with said worm, said portable aerator is kept substantially in place until it is untwisted from said worm.

9. The portable aerator of claim 1, wherein at least an outer surface of said base portion is made of cork.

10. The portable aerator of claim 1, wherein at least an outer surface of said base portion is made of rubber.

11. A portable aerator, comprising:
a main aeration body;
a base portion;
an internal cavity;
at least one ventilation shaft;
a spout portion;
an aeration opening; and
an aeration inlet wherein said internal cavity comprises a threaded channel;

wherein said internal cavity extends from a base portion opening to a spout portion opening;

wherein said internal cavity is configured to allow a liquid that enters said internal cavity body at said base opening to pass through said spout portion opening;

wherein said threaded channel is threaded on an interior surface, such that said threaded channel is configured to matingly engage and disengage with a worm of a corkscrew bottle opening device via twisting and untwisting, respectively;

wherein said base portion has a tapered external surface and is configured to matingly engage with an interior surface of a bottle opening of a bottle containing said liquid;

wherein said at least one ventilation shaft comprises a ventilation base opening and one or more side vents;

wherein said ventilation shaft is configured to pass air from said one or more side vents to a ventilation base opening when said liquid is passed through said internal cavity;

wherein at least one of said one or more side vents are not covered by said bottle opening when said portable aerator is engaged with said bottle opening; and wherein said aeration opening and said aeration inlet are configured to allow air to be drawn into said liquid as said liquid passes through said internal cavity.

12. The portable aerator of claim 11, wherein said aeration inlet is located at a narrow point of said internal cavity.

13. The portable aerator of claim 11, wherein said at least one ventilation shaft further comprises an extension tube; and wherein said extension tube is telescoping, such that it is configured to have a stored configuration and an extended configuration.

14. The portable aerator of claim 11, wherein when said portable aerator is engaged with said worm, said portable aerator is kept substantially in place until it is untwisted from said worm.

15. A portable aerator, comprising:

a main aeration body;

a base portion; an internal cavity;

at least one ventilation shaft;

a spout portion;

an aeration opening; and an aeration inlet wherein said internal cavity comprises a threaded channel;

wherein said internal cavity extends from a base portion opening to a spout portion opening;

wherein said internal cavity is configured to allow a liquid that enters said internal cavity body at said base opening to pass through said spout portion opening;

wherein said threaded channel is threaded on an interior surface, such that said threaded channel is configured to matingly engage and disengage with a worm of a corkscrew bottle opening device via twisting and untwisting, respectively;

wherein said base portion is configured to matingly engage with an interior surface of a bottle opening of a bottle containing said liquid;

wherein said at least one ventilation shaft comprises a ventilation base opening and one or more side vents; wherein said ventilation shaft is configured to pass air from said one or more side vents to a ventilation base opening when said liquid is passed through said internal cavity;

wherein at least one of said one or more side vents are not covered by said bottle opening when said portable aerator is engaged with said bottle opening; wherein said aeration opening and said aeration inlet are configured to allow air to be drawn into said liquid as said liquid passes through said internal cavity;

wherein said at least one ventilation shaft further comprises an extension tube;

wherein said extension tube is telescoping, such that it is configured to have a stored configuration and an extended configuration; and wherein when said portable aerator is engaged with said worm, said portable aerator is kept substantially in place until it is untwisted from said worm.

16. The portable aerator of claim 15, wherein said aeration inlet is located at a narrow point of said internal cavity.

17. The portable aerator of claim 16, wherein said base portion is tapered.

* * * * *